J. W. RICHARDSON.
Wheel Harrow.
No. 61,258.
Patented Jan. 15, 1867.
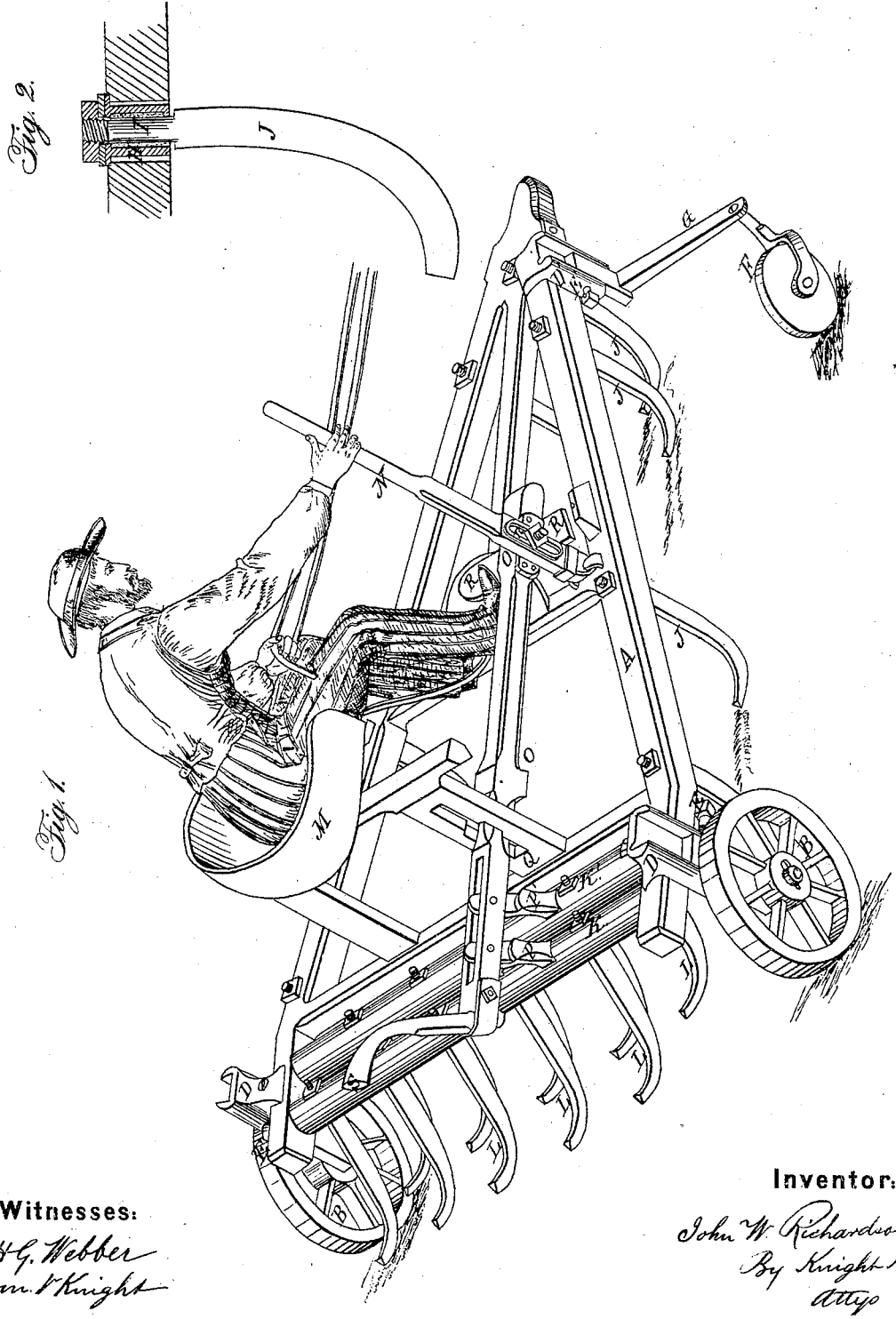
Witnesses:
H. G. Webber
Sam. P. Knight
Inventor:
John W. Richardson
By Knight Bros
Attys

United States Patent Office.

JOHN W. RICHARDSON, OF SLIGO, OHIO.

Letters Patent No. 61,258, dated January 15, 1867.

IMPROVEMENT IN HARROWS.

*The Schedule referred to in these Letters Patent and making part of the same.*

TO WHOM IT MAY CONCERN:

Be it known that I, JOHN W. RICHARDSON, of Sligo, Clinton county, Ohio, have invented a new and useful Improvement in Harrows; and I do hereby declare the following to be a full, clear, and exact description thereof, reference being had to the accompanying drawings, making a part of this specification.

The first part of this invention relates to a peculiar form and arrangement of harrow-teeth, which enables them to divide the clods in the most effectual manner. The second part of my invention relates to devices for clearing the rear teeth of the harrow of trash and restoring them to a working position. The third part of my invention relates to devices for temporarily elevating the teeth clear of the ground.

Figure 1 is a perspective view of a machine embodying my invention.

Figure 2 is an axial section of a harrow-tooth.

The frame A of my harrow has the form of an isosceles triangle, whose apex is presented forward, and is upheld on three wheels, of which two, B B', support the rear and revolve on studs or axles, C, secured at any desired height in a grooved bracket, D, by means of set-screws, E. The point or apex of the triangle is supported on a caster, F, journalled in an arm, G, secured at any desired height in the bracket D', by means of a set-screw, E'. The two sides of the triangular frame are provided with vertical boxes, H, to receive the shanks I of cimeter-formed teeth, or rather blades, J, which blades being thus journalled are capable of rotating on their said shanks as on axes, so as in connection with their peculiar shape to adjust themselves to the line of draught, and thus strike the clods fairly by their knife edges. This peculiar contour of their cutting edges enables the knives to run on to and sever the clods, instead of glancing or pushing them to one side. The construction and mode of applying the boxes H is more clearly represented in fig. 2. The top and bottom of the box constitute inwardly projecting collars, which afford a firm bearing for the journal without undue friction, and also form a chamber in which a lubricating material may be placed if desired. An outwardly projecting flange at top limits the descent of the box into the frame, and a suitable screw-nut is employed to confine the journal within the box. This construction permits the tooth and box to be inserted in the frame and removed therefrom bodily, and when driven down into the frame the box is grasped by the timber with sufficient force to support the weight of the frame and prevent accidental displacement. The base of the triangle is formed of two beams or shafts, K K', journalled in the rear ends of the sides and armed with blades, L, similar to those in front, except that they do not rotate on their shanks, but in place thereof rotate in a vertical plane as part and parcel of their shaft, when permitted so to do by the operator, so as to shed any trash that may have accumulated in front of them. This movement is placed under control of an operator, occupying a seat, M, upon the frame, by means of a lever, N, pivoted to a rod, O, which is itself pivoted to two arms, P P', which project upward from the shafts K K'. The rod O is notched, o, beneath, to engage over a projection, Q, on the frame, and thus hold the rear teeth firmly to their work until released by the operator. A treadle, R, whose counter-arm engages underneath the end of the rod O, enables the operator, by a motion of his foot, to lift the rod clear of its projection, and at the same time to throw the lever N backward within convenient reach of his hand. When the rod O is in its forward position the treadle again becomes available by lifting the rod to bring the lever to a convenient position forward. The pivot which connects the rod O with the lever N works in a slot, n, in the latter. A handle, S, projecting rearward from the rod O enables a person standing upon the ground to both operate the rod and also guide the machine. The blades upon the sides and back are so arranged collectively as to mark a series of equidistant furrows. The rear blades serve as keels to restrain the implement to its direct course.

I claim as new and of my invention—

1. The provision in a harrow of the cimeter-shaped blades J, adapted to revolve on their shanks or axes, boxed within the frame when employed with chambered metallic boxes H, constructed as represented in fig. 2, for the purpose explained.

2. The arrangement in a mounted or wheel-supported harrow of one or more shafts, K K', journalled transversely of the frame and armed with teeth or blades, L, in combination with the notched rod Q, projection Q, lever N, and treadle R, as and for the purpose set forth.

3. In combination with the elements of the clause immediately preceding, I claim the handle S, on the rear part of the rod O, for the several objects stated.

In testimony of which invention I hereunto set my hand.

JOHN W. RICHARDSON.

Witnesses:
 GEO. H. KNIGHT,
 JAMES H. LAYMAN.